United States Patent
Lesser et al.

(10) Patent No.: US 9,284,388 B2
(45) Date of Patent: Mar. 15, 2016

(54) SEMI-CRYSTALLINE THERMOPLASTIC POLYMERS AND ARTICLES MANUFACTURED THEREFROM

(71) Applicant: THE UNIVERSITY OF MASSACHUSETTS, Boston, MA (US)

(72) Inventors: Alan J. Lesser, Sunderland, MA (US); Brian M. Cromer, Amherst, MA (US); Edward B. Coughlin, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 14/700,645

(22) Filed: Apr. 30, 2015

(65) Prior Publication Data
US 2015/0315303 A1 Nov. 5, 2015

Related U.S. Application Data

(60) Provisional application No. 61/987,685, filed on May 2, 2014.

(51) Int. Cl.
*C08F 6/00* (2006.01)
*C08F 10/06* (2006.01)
*C08F 10/02* (2006.01)
*C08J 3/00* (2006.01)

(52) U.S. Cl.
CPC ............... *C08F 10/06* (2013.01); *C08F 10/02* (2013.01)

(58) Field of Classification Search
CPC .................................. C08F 10/06; C08F 10/02
USPC ............................... 526/351, 352.2; 528/502
See application file for complete search history.

(56) References Cited

PUBLICATIONS

T. Ikeda, V. A. Ravi, G. J. Snyder, "Evaluation of true interlamellar spacing from microstructural observations." J. Mater. Res., vol. 23, No. 9, Sep. 2008 pp. 2538-2544.

*Primary Examiner* — Terressa Boykin
(74) *Attorney, Agent, or Firm* — Cantor Colburn LLP (57) ABSTRACT

Disclosed herein is a method comprising masticating a molten polymer; where the polymer is semicrystalline polymer prior to melting; where the masticating polymer is conducted at an elevated temperature of Tm−15K to Tm+90K; where Tm is the crystalline melting point of the polymer; masticating the molten polymer while it is cooled from the elevated temperature to a temperature of Ta; where Ta is a temperature that is greater than Tc−10K, where Tc is the crystallization temperature of the polymer; and masticating the polymer at the temperature of Ta for a time period of 0.1 to 50 minutes.

17 Claims, 7 Drawing Sheets

Figure-1: Melt-Mastication heating protocol.

Figure 3: Uniaxial compression response of Melt-Masticated and melt processed iPP Figure 4: 2D SAXS profiles for Melt-Masticated and melt processed IPP (Exxon PP9999SS)

Compression Molded iPP
$W_i = 5.37 \pm 0.24$ mm
$W_o = 6.19 \pm 0.03$
$W_i / W_o = 0.86$

FIG. 5(A)

Melt Masticated iPP
$W_i = 7.20 \pm 0.11$ mm
$W_o = 7.20 \pm 0.11$
$W_i / W_o = 1$

SEMI-CRYSTALLINE THERMOPLASTIC POLYMERS AND ARTICLES MANUFACTURED THEREFROM

CROSS REFERENCE TO RELATED APPLICATION

This US Non-Provisional application claims the benefit of U.S. Provisional Application Ser. No. 61/987,685, filed 2 May 2014, the entire contents of which are hereby incorporated by reference.

BACKGROUND

This disclosure relates to semi-crystalline polymers and to articles manufactured therefrom.

Semi-crystalline thermoplastic polymers having high elastic modulus and tensile strength are generally produced by ultradrawing the polymer under uniaxial or biaxial stress. When the stress is applied to molten semi-crystalline thermoplastic polymers under specific conditions, the polymer undergoes flow induced crystallization, producing high crystalline polymer articles with high mechanical modulus. The use of directed stress however produces highly anisotropic properties, where the properties in stressed direction are very different from the properties in other directions, with 1000 to 3000% greater mechanical modulus in the draw direction, relative to the mechanical modulus perpendicular to the draw direction. In addition, articles prepared by flow induced crystallization that display such properties are generally in film or fiber form. Improved properties in the stressed direction over other directions are due primarily to high crystal volume fraction and high crystalline orientation in the direction of stress.

It is desirable to use flow induced crystallization to produce thermoplastic polymers with high crystallinity, where the high elastic modulus and strength properties are isotropic and not restricted to particular directions or to particular portions of the polymer, or mildly anisotropic, with up to 1000% increase in mechanical modulus in the draw direction, relative to the mechanical modulus perpendicular to the draw direction. It is also desirable to use flow induced crystallization to produce highly crystalline bulk thermoplastic polymer articles other than films and fibers, such as plates and rods.

SUMMARY

Disclosed herein is a method comprising masticating a molten polymer; where the polymer is semicrystalline polymer prior to melting; where the masticating polymer is conducted at an elevated temperature of Tm−15K to Tm+90K; where Tm is the crystalline melting point of the polymer; masticating the molten polymer while it is cooled from the elevated temperature to a temperature of Ta; where Ta is a temperature that is greater than Tc−10K, where Tc is the crystallization temperature of the polymer; and masticating the polymer at the temperature of Ta for a time period of 0.1 to 50 minutes.

Disclosed herein too is an article produced by a method comprising masticating a molten polymer; where the polymer is a semicrystalline polymer prior to melting; where the masticating polymer is conducted at an elevated temperature of Tm−15K to Tm+90K; where Tm is the crystalline melting point of the polymer; masticating the molten polymer while it is cooled from the elevated temperature to a temperature of Ta; where Ta is a temperature that is greater than about the crystallization temperature Tc of the polymer; and masticating the polymer at the temperature of Ta for a time period of 0.1 to 50 minutes; where the polymer after being masticated at the temperature of Ta for a time period of 0.1 to 50 minutes has a yield strength that is at least 10 percent greater than the yield strength of the same polymer that is melt processed without any melt mastication.

BRIEF DESCRIPTION OF THE FIGURES

FIG. 5 (A) shows the melt masticated iPP sample after molding;

FIG. 5 (B) shows the melt processed iPP sample after molding;

DETAILED DESCRIPTION

Disclosed herein is a method to produce highly semicrystalline polymers that display overall isotropic crystallinity and isotropic mechanical properties, or mildly anisotropic crystal orientation and mildly anisotropic mechanical properties. In addition to being isotropic or mildly anisotropic, the mechanical properties are superior to those displayed by other semicrystalline polymers that display isotropic properties. An advantage of the present method is that articles having large bulk volumes may be produced by this method and these articles display isotropic to mildly anisotropic structures and properties. In other words, the method is not restricted to just films, fibers, or sheets.

Most polymeric materials that have crystallinity are anisotropic. This is because the formation of crystals is facilitated by orientation of the bulk polymer. Anisotropic materials often have limited applications because of the non-uniformity of properties. Large portions of anisotropic materials are often scrapped because portions of these materials cannot be used in particular applications. The formation of isotropic semicrystalline structures and the resulting isotropic properties are therefore highly desirable because the amount of scrap generated by such materials is reduced thereby reducing cost. In addition, articles formed by this method have a higher percentage of crystallinity than other semicrystalline materials that have identical chemical structures but that are crystallized by other methods.

Figure 1:
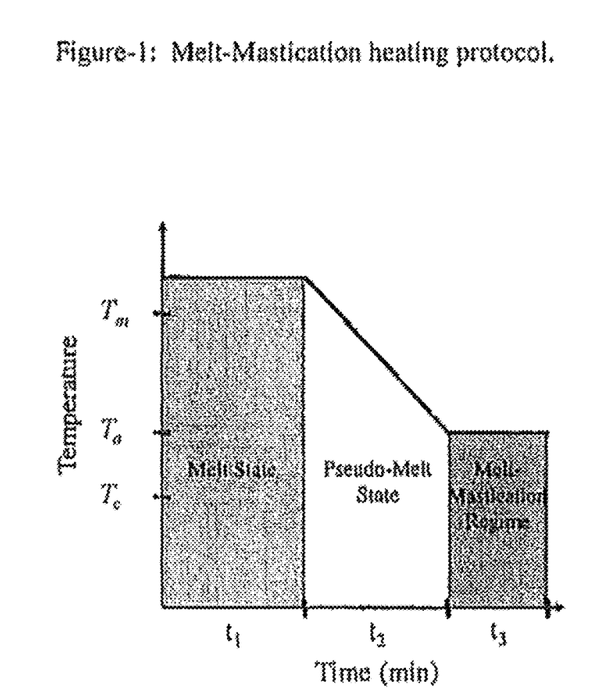
FIG. 1 is a graphical representation of the melt-mastication process.

The method disclosed herein is depicted in the FIG. 1 and comprises mixing (hereinafter termed melt-masticating) the semicrystalline organic polymeric material under three different temperature regimes, two of which are isothermal temperature regimes. The FIG. 1 is a plot of temperature (at which melt mastication is conducted) versus mastication time in minutes. The FIG. 1 shows that mastication is first conducted in the "melt state" for a time $t_1$ at a constant first temperature that is greater than the $T_m$, followed by pseudo-melt state mastication while the temperature is reduced from the temperature greater than the $T_m$ to a constant second temperature $T_a$ that is greater than about the crystallization temperature $T_c$. Mastication is conducted in the pseudo-melt state for a time $t_2$ minutes. Mastication is then conducted at the constant second temperature $T_a$ for a time of $t_3$ minutes. The temperature $T_a$ is a temperature at least partially sufficient to maintain the semicrystalline polymer in the deformable, or non-solid state, preferably lower than the $T_m$ and greater than $T_c-10K$, where $T_c$ is the crystallization temperature of the polymer. Following this sequence of mastication, the sample may be subjected to molding at a temperature less than or equal to the melting temperature $T_m$. Articles formed by this method have a higher percentage of crystallinity than other semicrystalline materials. They also display superior mechanical properties.

Melt processed samples (comparative samples) are also discussed herein. These are comparative samples and as such are processed without any melt mastication at a constant second temperature $T_a$ that is greater than about the crystallization temperature $T_c$ but lower than the melting point $T_m$. In short, the samples are not masticated at a constant temperature $T_a$ that lies between the crystallization temperature $T_c$ by lower than the melting point $T_m$ for any appreciable period of time. The melt processed samples may also be subjected to finishing processes such as compression molding, injection molding, vacuum forming, and the like after being melt processed.

With regard once again to the FIG. 1, the method comprises melt masticating (mixing) the semicrystalline polymer under isothermal conditions at a temperature proximate to the melting point "$T_m$" for a time period $t_1$. The term "proximate" includes temperatures of $T_m-15K$ to temperatures greater than the melting point such as $T_m+90K$. $T_m$ is measured in Kelvin. The melt mastication is preferably conducted at temperatures greater than the melting point $T_m$ of the semicrystalline polymer. The melt mastication is conducted for a time period $t_1$ of 2 to 50 minutes, specifically 3 to 30 minutes and more specifically 5 to 25 minutes. The time period may be increased or decreased depending upon the mass of material being masticated as well as depending upon the rate at which the mastication is conducted.

The mixing (melt mastication) is conducted in a device where the semicrystalline polymer is subjected to the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, or combinations comprising at least one of the foregoing. Exemplary forces are shear force, extensional force, compressive forces, or a combination thereof. Exemplary devices for conducting the melt masticating are static mixers.

Melt-masticating involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines. In an exemplary embodiment, the melt mastication is conducted in an extruder or in a molding machine.

The mixing in the pseudo-melt state is conducted for a time period $t_2$ minutes during which the temperature of the semicrystalline polymer being masticated is reduced from temperatures proximate to the $T_m$ to a temperature $T_a$ that is greater than 10 K below the crystallization temperature $T_c$. The crystallization temperature is "the temperature upon which the polymer or segments of the polymer start to crystallize when cooled from the melt well above that temperature". The polymer is continuously mixed during the cooling to $T_a$.

The cooling rate, during the temperature decrease from about the $T_m$ to the $T_a$ is about 1 to 30 Kelvin per minute (K/min), specifically 2 to 9 K/min and more specifically 3 to 5 K/min. The time $t_2$ may vary depending on the cooling rate, from 1 to 50 minutes, specifically 3 to 30 minutes and more specifically 10 to 20 minutes.

The rate of cooling during the time $t_2$ may be mathematically detailed by the following equation (1).

$$\frac{dQ}{dt} = \frac{Tm - Ta}{t2} \qquad (1)$$

where dQ is the incremental thermal energy imparted to the sample in an incremental time period dt, $T_m$ is the melting point of the semicrystalline polymer, $T_a$ is the isothermal temperature at which the quasi-melt is mixed. The term "quasi-melt" is used because at temperatures below the melting point, portions of the polymer are in a crystalline state and while the amorphous portions of the polymer are in a liquid state since they convert from a glassy state to a liquid state above the glass transition temperature $T_g$ (which is below $T_a$). The mastication temperature is low enough to initiate flow induced crystallization, but high enough to impede total crystallization, and keep the polymer in a "quasi-melt" state, where the polymer is viscous and deformable.

During the quasi-melt mastication period, the semicrystalline polymer is isothermally mixed at $T_a$ for a time $t_3$ minutes as depicted in the FIG. 1. The mastication temperature is a temperature near or above the quiescent crystallization temperature ($T_c$), but below the melting point $T_m$ of the semicrystalline polymer resin. Therefore, the mastication temperature is unique for each polymer, but is usually in the range $T_c-5K$ to $T_c+50K$. The mixing rate is constant throughout the process. The mixing rate can be any rate in the range 20 to 400 revolutions per minute, depending on the apparatus used for masticating the semicrystalline polymer as well as the mass of material being masticated. The mixing rate must be sufficient to impede total crystallization, or keep the polymer in a "quasi-melt" state, where the polymer is viscous and deformable.

The time period $t_3$ may vary from 0.1 to 50 minutes, specifically 1 to 30 minutes and more specifically 10 to 20 minutes.

After the processing in the aforementioned manner, the semicrystalline polymer may be removed from the device in which it was masticated. The polymer may then be subjected to a forming process such as compression molding, injection molding, blow molding, vacuum forming, and the like. During the forming process, the temperature of the masticated semicrystalline polymer is maintained above the crystallization temperature, at a temperature at least partially sufficient to maintain the semicrystalline polymer in the deformable, or non-solid state, but preferably below the melting point.

Semicrystalline polymers treated in this fashion show an increase in crystallinity of about 5 to 15 percent over other semicrystalline polymers that are not treated in this manner. The percent crystallinity may be measured using wide angle xray scattering or differential scattering calorimetry (DSC) at a heating rate of 10° C. (Celsius) per minute. The semicrystalline polymers produced by this method also display higher melting points and larger crystal long period. The melting point is generally 3° C. to 15° C. higher than the virgin polymer from which it was produced. The yield stress of polymers produced by this method is increased by about 10%, specifically by about 15%, and more specifically by about 20% over a comparative polymer (having the same chemistry) that is produced by a method where it is extruded and molded without being subjected to melt-mastication at two different constant temperature regimes. Crystals produced in this manner can form spherulites, which are not formed during other ultradrawing processes. The spherulites are also isotropically formed.

The crystallinity produced in this process is isotropic and is uniform in all directions. The amount of crystallinity and the types of crystals are uniform in all directions. The mechanical properties are also formed uniformly in all directions and are observed to be isotropic. In one embodiment, the polymer has mildly anisotropic crystallinity and has mildly isotropic mechanical properties, where the mechanical modulus in the drawing direction is less than 1000%, specifically less than 500%, specifically less than 100% and more specifically less than 10%, of the mechanical modulus perpendicular to the drawing direction.

The polymers that are subjected to the aforementioned process are semicrystalline polymers. The polymers may be thermoplastic polymers or thermosetting (crosslinkable) polymers. When thermosetting polymers are subjected to the aforementioned process, it is desirable that they be capable of crystallizing and that they be lightly crosslinked such that crystallization is not impeded.

The polymers that may be subjected to crystallization in the aforementioned manner may be homopolymers, copolymers, blends of semicrystalline with amorphous polymers, block copolymers, star block polymers, dendrimers, ionomers, or the like.

Examples of polymers are polyacetals, polyolefins, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, polysiloxanes, or the like, or a combination comprising at least one of the foregoing polymers. Exemplary polymers are polyolefins.

Additives may be added to the semicrystalline polymer prior to, during or after the mastication. The additives can be dyes, colorants, antioxidants, antiozonants, thermal stabilizers, flame retardants, radiopaque additives, impact modifiers, mold release agents, antibacterial additives, antimicrobial additives, or the like. The highly crystalline semicrystalline polymers may be molded into panels for automobiles, computer terminals, outdoor and indoor furniture, frames for buildings, or the like.

The composition and method described herein is exemplified by the following examples.

EXAMPLE

This example demonstrates the melt mastication of a variety of different polyolefins using the method described herein.

Melt-Mastication of Isotactic Polypropylene (iPP)

Specific process conditions for Melt-Mastication of iPP (according to FIG. 1), are summarized in Table 1.

TABLE 1

| | |
|---|---|
| $t_1$ | 10 minutes |
| $t_2$ | 15 minutes |
| $t_3$ | 10 minutes |
| $T_m$ | 164° C. |
| $T_c$ | 111.7° C. |
| $T_a$ | 145° C. |
| dQ/dt | −3 K/min |
| Oxidative Stabilizers Added | 0.05 wt % Irganox + 0.05 wt % Irgafos 168 |

The iPP pellets, and stabilizers were pre-mixed and melt processed at 190° C. in a batch mixer (Brabender, R.E.E. 6) for 15 minutes at 60 revolutions per minute (RPM). Under constant mixing, the sample was cooled at −3° C./min to 145° C. and then isothermally masticated for 10 minutes. The sample was air cooled to room temperature.

Melt-Mastication of Linear Low Density Polyethylene (LLDPE)

Specific process conditions for Melt-Mastication of Linear Low Density Polyethylene (according to FIG. 1), are summarized in Table 2.

TABLE 2

| | |
|---|---|
| $t_1$ | 10 minutes |
| $t_2$ | 15 minutes |
| $t_3$ | 10 minutes |
| $T_m$ | 124.6° C. |
| $T_c$ | 105.7° C. |
| $T_a$ | 111° C. |
| dQ/dt | −3 K/min |
| Oxidative Stabilizers Added | 0.05 wt % Irganox + 0.05 wt % Irgafos 168 |

LLDPE pellets and stabilizers were pre-mixed and melt processed at 170° C. in a batch mixer (Brabender, R.E.E. 6) for 15 minutes at 60 RPM. Under constant mixing, the sample was cooled at −3° C./min to 111° C. and then isothermally masticated for 10 minutes. The sample was air cooled to room temperature.

Melt-Mastication of High Density Polyethylene (HDPE) #1 and #2

Specific process conditions for Melt-Mastication of two different grades of High Density Polyethylene (HDPE) (according to FIG. 1), are summarized in Tables 3 and 4. The grades of polyethylene have different Melt Flow Indices, determined according to ASTM 1238.

TABLE 3

| | |
|---|---|
| $t_1$ | 5 minutes |
| $t_2$ | 20 minutes |
| $t_3$ | 15 minutes |
| $T_m$ | 131.8° C. |
| $T_c$ | 115° C. |

TABLE 3-continued

| | |
|---|---|
| $T_a$ | 121° C. |
| dQ/dt | −2.5 K/min |
| Oxidative Stabilizers Added | 0.05 wt % Irganox + 0.05 wt % Irgafos 168 |

TABLE 4

| | |
|---|---|
| $t_1$ | 5 minutes |
| $t_2$ | 20 minutes |
| $t_3$ | 15 minutes |
| $T_m$ | 136.3° C. |
| $T_c$ | 115.8° C. |
| $T_a$ | 121° C. |
| dQ/dt | −2.5 K/min |
| Oxidative Stabilizers Added | 0.05 wt % Irganox + 0.05 wt % Irgafos 168 |

HDPE pellets and stabilizers were pre-mixed and melt processed at 170° C. in a batch mixer (Brabender, REE 6) for 5 minutes at 60 RPM. Under constant mixing, the sample was cooled at −2.5° C./min to 121° C. and then isothermally masticated for 15 minutes. The sample was air cooled to room temperature.

Comparative Examples

Conventional Melt Processing

For reference, samples of each polymer (iPP, LLDPE, HDPE #1 and #2) were prepared by conventional melt processing. For each sample, the resin pellets and stabilizers were pre-mixed and melt processed for 10 minutes at a temperature above the resin $T_m$ (190° C. for iPP, 170° C. for LLDPE and HDPE).

Experimental Evidence

Presented is experimental evidence demonstrating improved properties in semicrystalline thermoplastic polymers prepared by melt-mastication. Specific improvements include: increased crystal volume fraction ($X_c$), increased melting point ($T_m$), increased dynamic mechanical modulus (G'), increased elastic modulus (E), increased compressive yield strength ($\sigma_y$), and increased crystal long period ($d_{ac}$).

Materials and Methods

Thermal and mechanical properties were measured using a Differential Scanning Calorimeter (TA Instruments-DSC Q200) and a Dynamic Mechanical Analyzer (TA Instruments-DMA Q800), and Instron 4466 testing machine. Calorimetry was performed between 20 and 215° C. with a constant ramp rate of 10° C./min. Two heating and cooling cycles were used. Melting and crystallization analyses were performed on the heating and the cooling ramps, respectively.

Melting enthalpy was derived from integrating the melting curve from 80° C. to the end of melting. To determine $X_c$d, melting enthalpy was normalized by the enthalpy of a perfect crystal, 207.0 J/g for iPP and 295.5 J/g for polyethylene.

Samples for mechanical analysis samples were prepared by compression-molding followed by milling. Melt-masticated samples were compression molded at $T_a$. Comparative example (melt processed) samples were compression molded above $T_m$. DMA samples (30×10×0.5 mm) were cut from 0.5 mm thick plaques and analyzed at a constant frequency of 10 Hz, oscillation amplitude of 5 μm, and over a temperature range of −15° C. to 150° C., ramp rate 3° C./min. Compression samples (samples for compression testing) (cylindrical, 4.73×4.73 mm) were milled from 4.73 mm thick plaques.

Small angle x-ray scattering (SAXS) was performed on a Rigaku S-Max3000, wavelength 0.1542 nm.

Melt-masticated samples were compression molded at the mastication temperature ($T_a$). Comparative example samples (melt processed samples) were compression molded above $T_m$. Both samples were allowed to air-cool to room temperature. For each sample, a 2D SAXS profile was obtained, and I(q) vs q was analyzed along the meridian. The long period ($d_{ac}$) was assigned to the q of maximum intensity.

Thermal Calorimetry

Results from DSC thermal calorimetry are presented in Table 5. Four grades of semicrystalline thermoplastic polymers (iPP, LLDPE, HDPE #1, HDPE #2) are analyzed, both before and after mastication. $T_{m,1}$ and $T_{m,2}$ correspond to the maximum of the endothermic melting peak for the first and second melting curves, respectively. $X_{c,1}$ and $X_{c,2}$ correspond to the crystal volume fraction calculated from the first and second melting curves, respectively. The crystal volume fraction is defined by Equation 2.

$$X_c = \frac{\Delta H_m}{\Delta H_m^\circ} \qquad (2)$$

where $\Delta H_m$ is the melting enthalpy and $\Delta H°_m$ is the theoretical melting enthalpy of a totally crystalline sample.

TABLE 5

| Sample ID | $T_{m,1}$ (° C.) | $T_{m,2}$ (° C.) | $X_{c,1}$ (%) | $X_{c,2}$ (%) |
|---|---|---|---|---|
| Melt masticated iPP | 177.4 | 163.8 | 57.0 | 49.4 |
| Virgin iPP | 167.1 | 164.3 | 41.5 | 47.6 |
| Melt masticated LLDPE | 127.8 | 123.9 | 55.1 | 54.3 |
| Virgin LLDPE | 127.1 | 124.6 | 49.4 | 52.6 |
| Melt masticated HDPE (4, 4) | 138.0 | 131.9 | 72.3 | 69.6 |
| Virgin HDPE (4, 4) | 134.8 | 131.8 | 63.9 | 73.6 |
| Melt masticated HDPE (8, 3) | 140.8 | 134.7 | 86.3 | 81.1 |
| Virgin HDPE (8, 3) | 135.2 | 136.3 | 69.3 | 80.3 |

The melt-masticated samples demonstrate increased $T_{m,1}$ and $X_{c,1}$, compared to virgin samples of the same composition. For example, $T_{m,1}$ and $X_{c,1}$ of Melt-Masticated iPP increase by 10.3 K and 37% relative to virgin iPP, respectively. In the literature, $T_{m,1}$ is directly related to the lamellar thickness, which can be described by the long period ($d_{ac}$). The results suggest that melt-mastication produces a crystal morphology with relatively thick lamella and high crystal volume fraction, which is supported by the SAXS results. After the first melting curve, the crystal morphology is erased, therefore $T_{m,2}$ and $X_{c,2}$ are independent of process conditions.

Dynamic Mechanical Analysis

Figure 2:
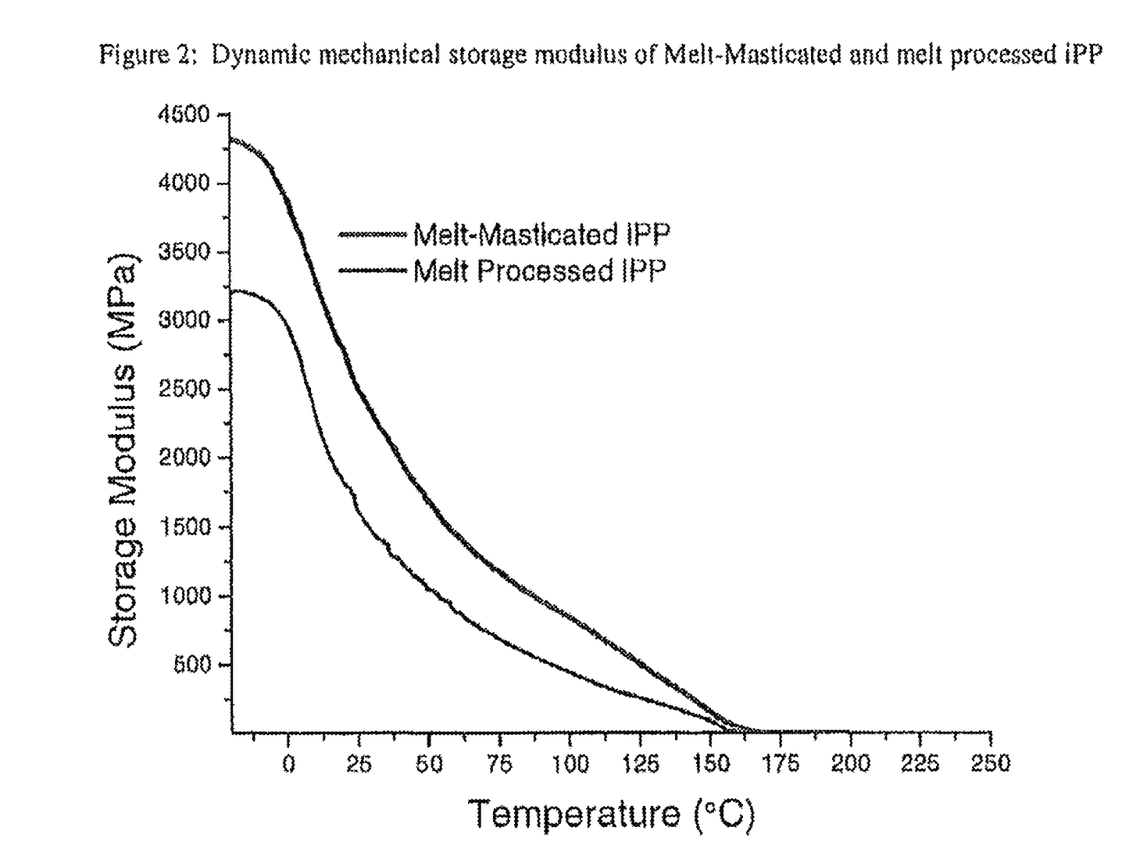
FIG. 2 is a graph showing the dynamic mechanical storage modulus of melt-masticated and melt processed isotactic polypropylene.

Results from Dynamic Mechanical Analysis are presented in FIG. 2 and Table 6. At 20° C., the G' of melt-masticated iPP is 2794 MPa, 53% higher than conventionally melt processed iPP (1822 MPa). Furthermore, melt-masticated iPP maintained mechanical integrity at higher temperatures (96 MPa at 155° C.), compared to conventionally melt processed iPP (36 MPa at 155° C.).

TABLE 6

| Sample | Yield Stress $\sigma_y$ (MPa) | Strain at yield $\epsilon_y$ | E (MPa) | G' (MPa) |
|---|---|---|---|---|
| Melt Processed iPP | 59.5 | 0.09 | 653 | 1822 |
| Melt-Masticated iPP | 84.9 | 0.07 | 1465 | 2794 |

From the Table 6 it may be seen that the static elastic modulus or the dynamic elastic modulus is increased by an amount of at least 50%, specifically at least 75% and more specifically at least 100%, over a chemically identical composition that has been processed differently. The increase in the static elastic modulus or the dynamic elastic modulus can be up to 200%, specifically up to 300%.

Uniaxial Compressive Analysis

Figure 3:
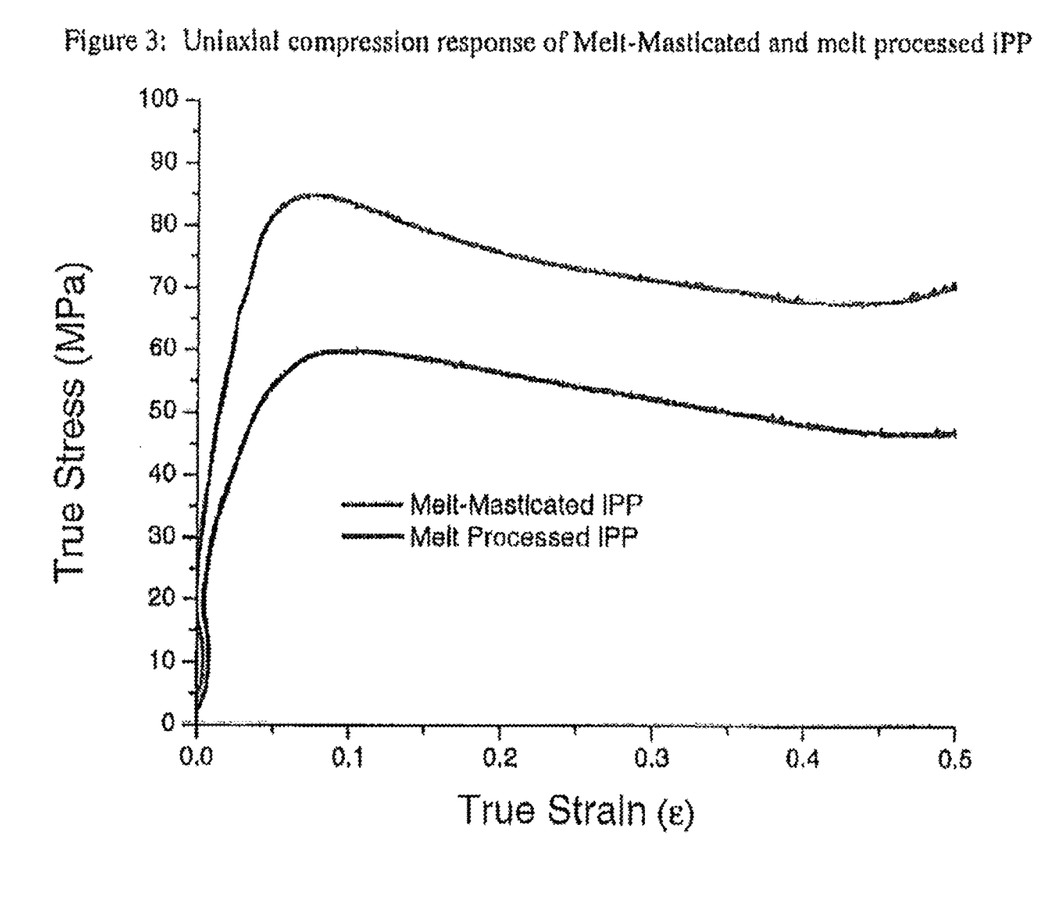
FIG. 3 is a graph showing uniaxial compression response of melt-masticated and melt processed isotactic polypropylene. Melt processed samples are not subjected to melt mastication between temperatures greater than the $T_m$ to temperatures greater than about the crystallization temperature $T_c$.

Results from uniaxial compressive analysis are presented in FIG. 3 and Table 6. The yield strength ($\sigma_y$) and elastic modulus (E) are expected to increase for a more highly crystalline sample. Indeed, both the E and $\sigma_y$ are significantly higher for highly crystalline melt-masticated iPP. The small distortion near $\epsilon$=0.01 is an artifact of the instrument.

Small Angle X-Ray Scattering Analysis

Small Angle X-ray Scattering (SAXS) analysis was performed to characterize the long period ($d_{ac}$) of melt-masticated and conventionally melt processed iPP. The results are summarized in FIG. 4 and Table 7. The period $d_{ac}$ describes the periodicity of layer-like crystallites in semicrystalline polymers. Long period is inversely related to $T_m$. Accordingly, samples with elevated $T_m$ are expected to have higher period $d_{ac}$ compared to samples with lower $T_m$.

Table 7 shows the long period for melt-masticated iPP is larger than that of melt processed iPP. Furthermore, the long period for melt processed iPP increases 3.6 nm from 24° C. to 172° C., compared to melt-masticated iPP (1.3 nm increase). The increase in long period is due to recrystallization, a well-known property of semicrystalline polymers. Recrystallization continues until reaching an equilibrium long period value, at which point melting occurs. In contrast, minimal recrystallization is seen for melt-masticated iPP. This indicates the long period produced by melt-mastication is greater than the equilibrium long period value under quiescent conditions.

TABLE 7

| Sample | Temperature (° C.) | Long Period ($d_{ac}$, nm) |
|---|---|---|
| Melt Processed iPP | 24 | 16.1 |
| Melt Processed iPP | 155 | 16.5 |
| Melt Processed iPP | 166 | 19.3 |
| Melt Processed iPP | 172 | 19.7 |
| Melt-Masticated iPP | 24 | 24.1 |
| Melt-Masticated iPP | 155 | 24.6 |
| Melt-Masticated iPP | 166 | 24.6 |
| Melt-Masticated iPP | 172 | 25.4 |

Figure 4:
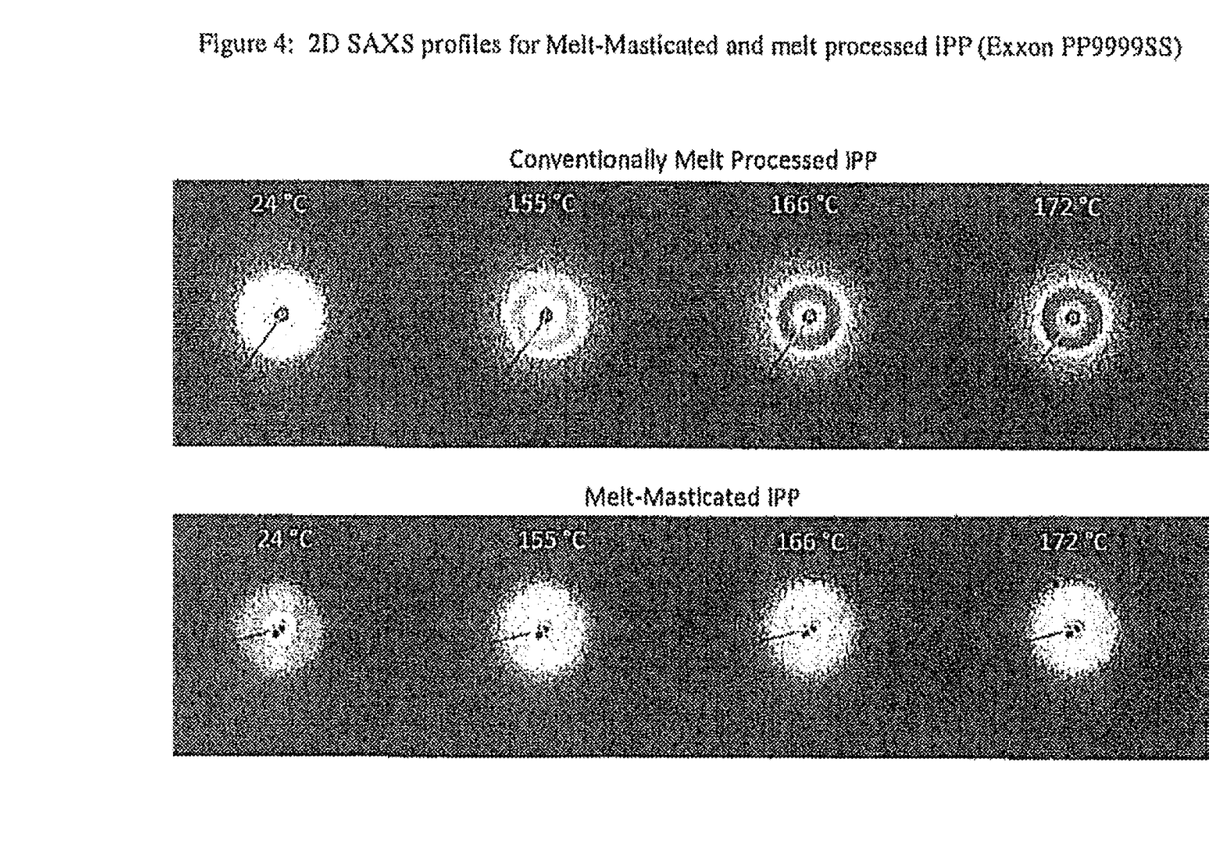
FIG. 4 shows photomicrographs of small angle xray scattering profiles for melt-masticated and melt processed isotactic polypropylene.

FIG. 4 shows the 2D SAXS profile for melt-masticated and conventionally melt processed iPP. Both samples show increasing scattering intensity with increasing temperature, due to changes in electron density of the amorphous and crystalline regions. Conventionally melt processed iPP demonstrates isotropic scattering. However, melt-masticated iPP demonstrates both isotropic and anisotropic scattering, the latter manifesting as lobes on the meridian. This behavior is common for flow induced crystallization articles. The anisotropic scattering behavior is likely a consequence of the sample preparation. The flow field created by compression molding of melt-masticated polymer likely imparts crystal orientation to the final article. From Table 7 it may also be seen that the long period for the melt-masticated sample is fairly constant with increasing temperature while for the non-melt masticated sample it increases with increasing temperature.

From the Table 7 and the FIG. 4 it may be seen that as a result of melt mastication, the crystalline long period is increased by an amount of 20 to 60%, specifically 25 to 50% over an identical composition that has been processed at the same temperature but under different processing conditions.

Mold Shrinkage

Mold shrinkage is a common problem encountered in the semicrystalline polymer processing industry. In polymer processing, polymers are shaped into desired products through forming processes such as compression molding, injection molding, or vacuum forming. The common feature of all of these processes is that the polymer is first melted, then formed, and finally allowed to cool and harden. However, when a mass of molten polymer undergoes cooling, the polymer will contract as the temperature drops. This phenomena is called "mold shrinkage," and can be compared to linear thermal contraction or expansion. In fact, polypropylene is known to shrink by up to 2.5% during cooling. Mold shrinkage is a undesirable, because it causes the final polymer product to have a shape different from the mold. Polymers manufactured using melt mastication however display vastly lower amounts of melt shrinkage.

Isotactic polypropylene was prepared by melt mastication, in a process identical to Example 1 above. After the iPP was masticated for 10 minutes, the sample was removed from the static mixer and placed into a 25.4 mm×50.8 mm×6.35 mm mold. The polymer in the mold was compressed at 5 tons force at 154° C. for 5 minutes, and finally allowed to cool to room temperature. This material is referred to as "Melt-Masticated iPP."

For comparison, isotactic polypropylene was prepared by compression molding. Untreated isotactic polypropylene pellets were placed into a 25.4 mm×50.8 mm×6.35 mm mold, then heated to 200° C. for 15 minutes, until the pellets were fully melted. Then, the polymer in the mold was compressed at 5 tons force at 200° C. Finally, the polymer in the mold was allowed to cool to room temperature. This material is referred to as "Compression Molded iPP" because it is melt processed.

Figure 5A:
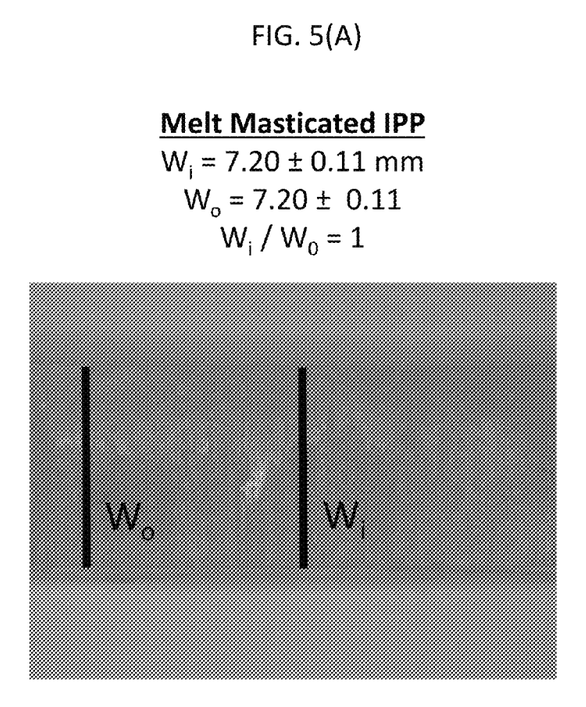
Figure 5B:
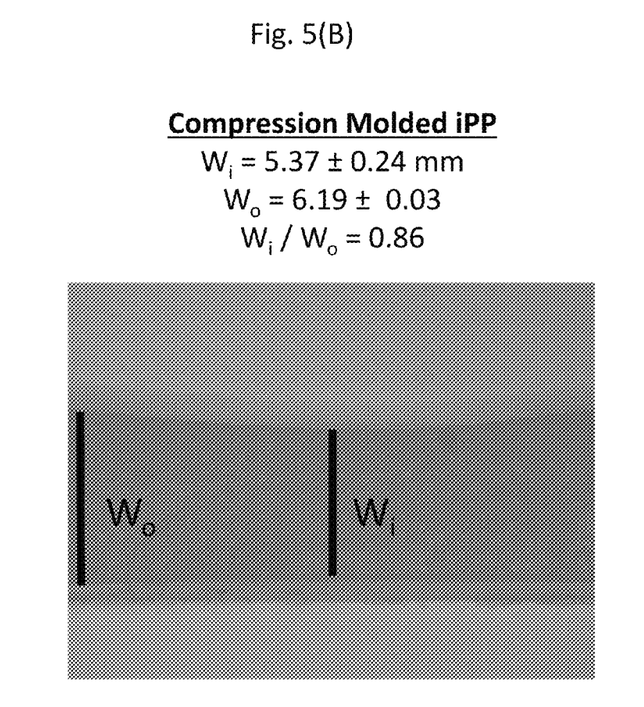

After cooling, each sample was bisected by cutting with a bandsaw. The cut surfaces were imaged with a camera and are shown here in the FIG. 5. FIG. 5 (A) shows the Melt Masticated iPP, while FIG. 5(B) depicts the Compression Molded iPP. The thickness of each sample was recorded at the edge, and at the center, of each sample.

From the FIG. 5(B) it may be seen that mold shrinkage is clearly observed for Compression Molded iPP. Even though the mold has a rectangular shape, the final polymer article was a rectangle with a concave surface. This concave surface is caused by mold shrinkage. The ratio between the edge thickness and center thickness is a quantitative estimation of mold shrinkage. For Compression Molded iPP, the center thickness is 86% of the edge thickness, indicating significant mold shrinkage occurred.

FIG. 5(A) shows that mold shrinkage is not observed for Melt Masticated iPP. Both the mold and the final piece have a perfectly rectangular shape; the edge and center thicknesses are identical. The ratio between edge and center thickness is 1.00.

Polarized Optical Microscopy

The crystal morphology of semicrystalline polymers, like polypropylene are well defined. Polymer crystals are organized into hierarchical crystal structures, consisting of lamella and spherulites. Many individual polymer chains are organized into flat crystals called "lamella," which are about 5 to 15 nanometers in thickness. Many lamella are organized into spherical structures called "spherulites," which are about 50 to 500 micrometers (μm) in diameter. Two common techniques to study iPP crystal morphology are polarized optical microscopy and Atomic force Microscopy (AFM).

Figure 6:
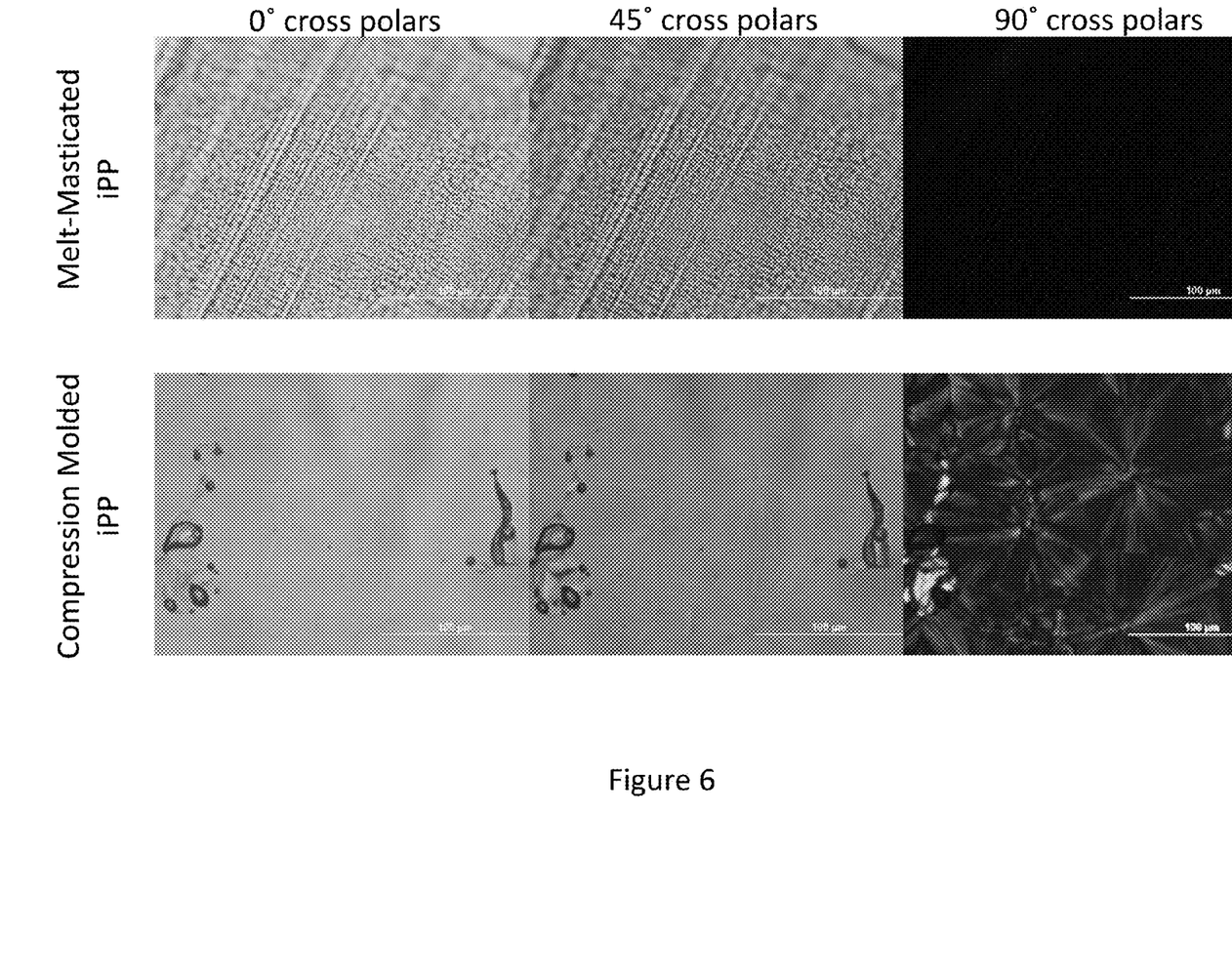
FIG. 6 shows polarized optical microscopy for the melt processed sample as well as for the melt masticated sample.

The materials seen in the FIGS. 5(A) and 5(B) were sectioned with a glass microtome knife. The sections (10 μm thick) were analyzed by optical microscopy equipped with two polarizers. The angle between the polarizers was varied from 0 to 90 degrees. Polarized optical microscopy was used to identify any micron-scale crystal features in Melt-Masticated iPP and Compression Molded iPP. For Compression Molded iPP (bottom 3 images), the classical spherulitic structure at 90 degrees, consisting of approximately 100 μm diameter spherulites are observed. However, for Melt-Masticated iPP (top 3 images), spherulites are not visible. In fact, there does not appear to be any morphological organization for the Melt-Masticated iPP.

Atomic Force Microscopy

The materials described the FIG. 6 were cut with a glass microtome knife at −20° C. to create a smooth imaging surface. AFM photomicrographs for the Melt-Masticated iPP sample (left) and for the Compression-Molded iPP sample (right) may be seen in the FIG. 7.

Atomic force microscopy (AFM) was used to identify the nano-scale crystal features in melt masticated iPP and compression molded iPP. Specifically, AFM is an excellent tool to identify the size and orientation of crystal lamella.

Figure 7:
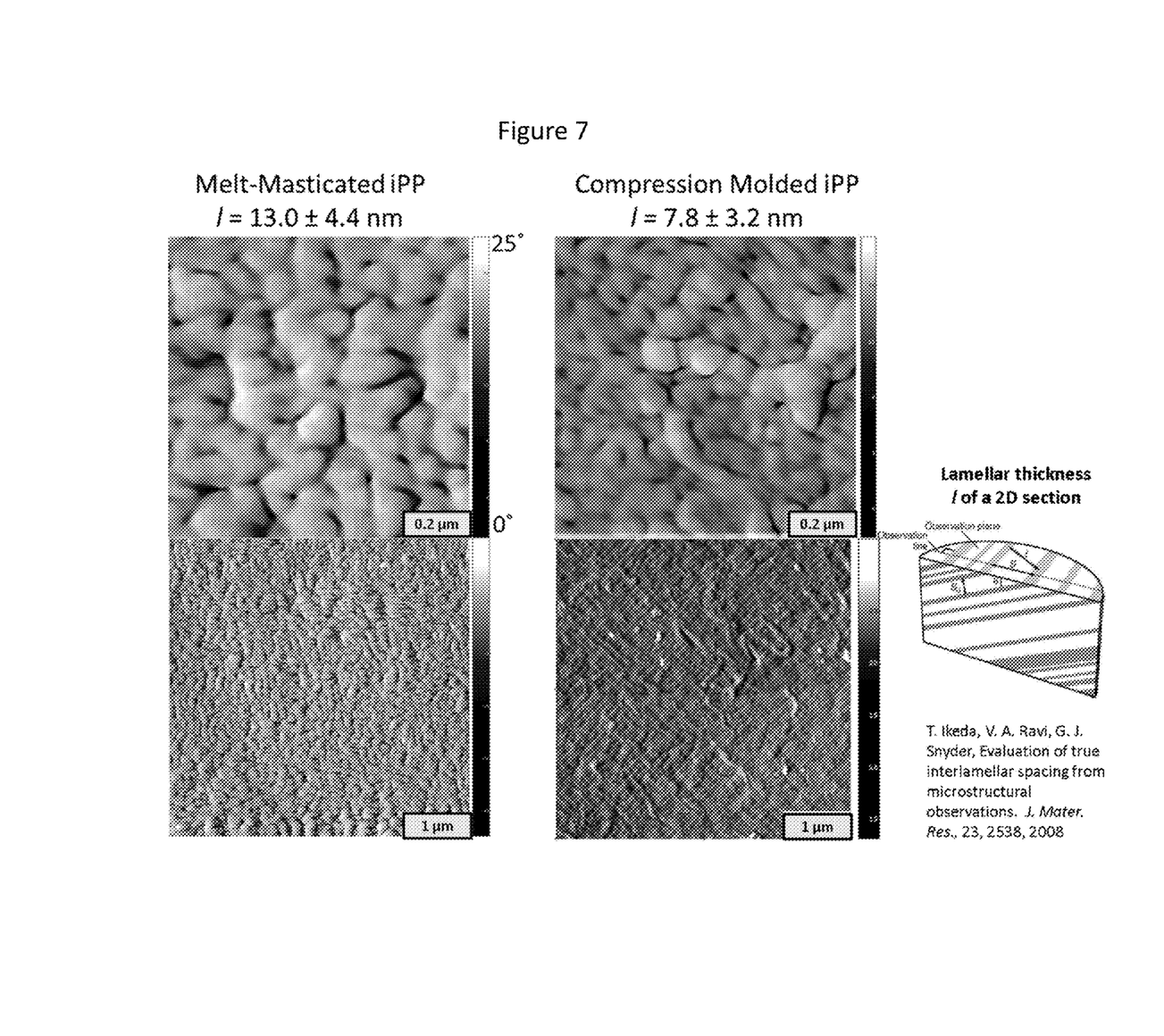
FIG. 7 shows images obtained using atomic force microscopy for the melt processed sample as well as for the melt masticated sample.

The size of lamella can be calculated from the top AFM images of the FIG. 7. The dark features correspond to lamella. Furthermore, the thickness of the dark features corresponds to the lamellar thickness, l. The orientation between the lamella and the surface is unknown, therefore the observed lamellar thickness is likely larger than the true lamellar thickness (see figure on the right). For this reason, the true lamellar thickness was calculated from a quantitative stereological treatment described in: "T. Ikeda, V. A. Ravi, G. J. Snyder, *Evaluation of true interlamellar spacing from microstructural observations. J. Mater. Res.*, 23, 2538, 2008." The true lamellar thicknesses are listed at the top of each image. Quantitative stereology shows that Melt-Masticated iPP produces thicker lamellar crystals than the Compression Molded iPP. These results corroborate the Small Angle X-ray Scattering (SAXS) results discussed earlier.

The orientation of lamella can also be estimated from the bottom AFM images of the FIG. 7. The image on the right (Compression Molded iPP) shows the classical lamellar cross-hatch pattern (orientation of dark regions along the diagonals of the image) that is characteristic of Compression Molded iPP. However, the image on the left (Melt Masticated iPP) does not show any orientation of lamella. Both AFM and Optical microscopy show that melt masticated iPP does not have a hierarchical crystal structure. This morphology can be used as a diagnostic tool to ascertain if a iPP article has been treated with melt-mastication or not.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method comprising:
    masticating a molten polymer; where the polymer is semicrystalline polymer prior to melting; where the masticating polymer is conducted at an elevated temperature of $T_m-15K$ to $T_m+90K$; where $T_m$ is the crystalline melting point of the polymer;
    masticating the molten polymer while it is cooled from the elevated temperature to a temperature of $T_a$; where $T_a$ is a temperature that is greater than $T_c-10K$, where Tc is the crystallization temperature of the polymer; and
    masticating the polymer at the temperature of $T_a$ for a time period of 0.1 to 50 minutes.

2. The method of claim 1, where the masticating of the molten polymer is conducted for a time period of 3 to 50 minutes at an elevated temperature of $T_m-15K$ to $T_m+90K$.

3. The method of claim 1, where the masticating of the molten polymer is conducted for a time period of 3 to 50 minutes while it is cooled from the elevated temperature to a temperature of $T_a$.

4. The method of claim 1, further comprising forming the polymer after masticating the polymer at the temperature of $T_a$ for a time period of 0.1 to 50 minutes.

5. The method of claim 1, further comprising forming the polymer after masticating the polymer at the temperature of $T_a$ for a time period of 0.1 to 50 minutes.

6. The method of claim 1, where the masticating is conducted in a static mixer that subjects the polymer to shear forces, extensional forces, compressive forces, or a combination thereof.

7. An article produced by a method comprising:
    masticating a molten polymer; where the polymer is semicrystalline polymer prior to melting; where the masticating polymer is conducted at an elevated temperature of $T_m-15K$ to $T_m+90K$; where Tm is the crystalline melting point of the polymer;
    masticating the molten polymer while it is cooled from the elevated temperature to a temperature of $T_a$; where $T_a$ is a temperature that is greater than $T_c-10K$; and
    masticating the polymer at the temperature of $T_a$ for a time period of 0.1 to 50 minutes; where the polymer after being masticated at the temperature of $T_a$ for a time period of 0.1 to 50 minutes has a yield strength that is at least 10 percent greater than the yield strength of the same polymer that is melt processed without any melt mastication.

8. The article of claim 7, where the polymer has isotropic crystallinity.

9. The article of claim 7, where the polymer has mildly anisotropic crystallinity.

10. The article of claim 7, where the polymer has isotropic mechanical properties.

11. The article of claim 7, where the polymer has mildly isotropic mechanical properties, where the mechanical modulus in the drawing direction is less than 1000% the mechanical modulus perpendicular to the drawing direction.

12. The article of claim 7, where the polymer is devoid of spherulites.

13. The article of claim 7, where the polymer undergoes substantially no mold shrinkage when it is injection molded or compression molded.

14. The article of claim 7, where the polymer displays at least a 50% increase in elastic modulus over the same polymer that is extruded without any melt mastication.

15. The article of claim 7, where the polymer displays a crystalline long period that is increased by an amount of 20 to 60% over the same polymer that is extruded without any melt mastication.

16. The article of claim 7, where the polymer is a thermoplastic polymer.

17. The article of claim 7, where the polymer is a thermosetting polymer.

\* \* \* \* \*